US012614915B2

(12) United States Patent
Shimura et al.

(10) Patent No.: US 12,614,915 B2
(45) Date of Patent: Apr. 28, 2026

(54) ENERGY STORAGE APPARATUS AND CHARGE/DISCHARGE CONTROL METHOD

(71) Applicant: MURATA MANUFACTURING CO., LTD., Kyoto (JP)

(72) Inventors: Jusuke Shimura, Kyoto (JP); Michiya Mori, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 816 days.

(21) Appl. No.: 17/722,678

(22) Filed: Apr. 18, 2022

(65) Prior Publication Data

US 2022/0239132 A1 Jul. 28, 2022

Related U.S. Application Data

(63) Continuation of application No. PCT/JP2020/039644, filed on Oct. 22, 2020.

(30) Foreign Application Priority Data

Oct. 25, 2019 (JP) ................................. 2019-194565

(51) Int. Cl.
*H02J 7/82* (2026.01)
*H01M 4/583* (2010.01)
(Continued)

(52) U.S. Cl.
CPC .............. *H02J 7/82* (2026.01); *H01M 4/583* (2013.01); *H01M 10/441* (2013.01); *H02J 7/1492* (2013.01); *H01M 2004/027* (2013.01)

(58) Field of Classification Search
CPC ...... H02J 7/0048; H02J 7/1492; H01M 4/583; H01M 10/441; H01M 2004/027
(Continued)

(56) References Cited

U.S. PATENT DOCUMENTS 5,883,496 A 3/1999 Esaki et al.
2007/0284159 A1* 12/2007 Takami ................... B60L 50/16
429/61
(Continued)

FOREIGN PATENT DOCUMENTS

CN 103329339 9/2013
CN 108819731 11/2018
(Continued)

OTHER PUBLICATIONS

S. Lee, P. Mohtat, J. B. Siegel and A. G. Stefanopoulou, "Beyond Estimating Battery State of Health: Identifiability of Individual Electrode Capacity and Utilization," 2018 Annual American Control Conference (ACC), Milwaukee, WI, USA, 2018, pp. 2288-2293, doi: 10.23919/ACC.2018.8430743. pp. 1-3 (Year: 2018).*
(Continued)

*Primary Examiner* — Julian D Huffman
*Assistant Examiner* — John P Ondrasik
(74) *Attorney, Agent, or Firm* — K&L Gates LLP

(57) ABSTRACT

An energy storage apparatus includes a plurality of secondary batteries each including a negative electrode including crystalline carbon; and a charge/discharge control unit that
(Continued)

controls charge/discharge of the plurality of secondary batteries so that a state of charge does not fall within a range of 50% or more and 70% or less.

6 Claims, 8 Drawing Sheets

(51) Int. Cl.

|   |   |
|---|---|
| *H01M 10/44* | (2006.01) |
| *H02J 7/14* | (2006.01) |
| *H01M 4/02* | (2006.01) |

(58) Field of Classification Search

USPC ........................................................ 320/134

See application file for complete search history.

(56) References Cited

U.S. PATENT DOCUMENTS

| 2012/0032647 | A1 * | 2/2012 | Watanabe | ............. | H01M 4/587 |
| | | | | | 320/136 |
| 2013/0009605 | A1 | 1/2013 | Hongo et al. | | |
| 2013/0175997 | A1 * | 7/2013 | Hongo | .................. | H02J 7/0048 |
| | | | | | 320/134 |
| 2013/0282316 | A1 | 10/2013 | Goto | | |
| 2014/0197798 | A1 | 7/2014 | Hongo et al. | | |
| 2016/0221456 | A1 * | 8/2016 | Rhodes | ............... | B60L 15/2045 |
| 2018/0313905 | A1 | 11/2018 | Takahashi | | |

FOREIGN PATENT DOCUMENTS

| EP | 0807546 | | 11/1997 |
| JP | H09308013 | A | 11/1997 |
| JP | 2012143151 | A | 7/2012 |
| JP | 2015144519 | A | 8/2015 |
| JP | 2016012983 | A | 1/2016 |
| JP | 2018185260 | A | 11/2018 |
| JP | 2019122122 | A | 7/2019 |
| WO | 2012095894 | A1 | 7/2012 |
| WO | 2013038763 | A1 | 3/2013 |

OTHER PUBLICATIONS

International Search Report of corresponding PCT application PCT/JP2020/039644, dated Dec. 1, 2020.

Ovejas, et al., State of charge dependency of the overvoltage generated in commercial Li-ion cells, Journal of Power Sources, 418 (2019), 176-185.

Extended European Search Report issued Nov. 9, 2023 in corresponding European Application No. 20878635.0.

Office Action issued in corresponding European Patent Application No. 20878635.0, mailed Jan. 23, 2026. 4 pages.

* cited by examiner

FIG. 3

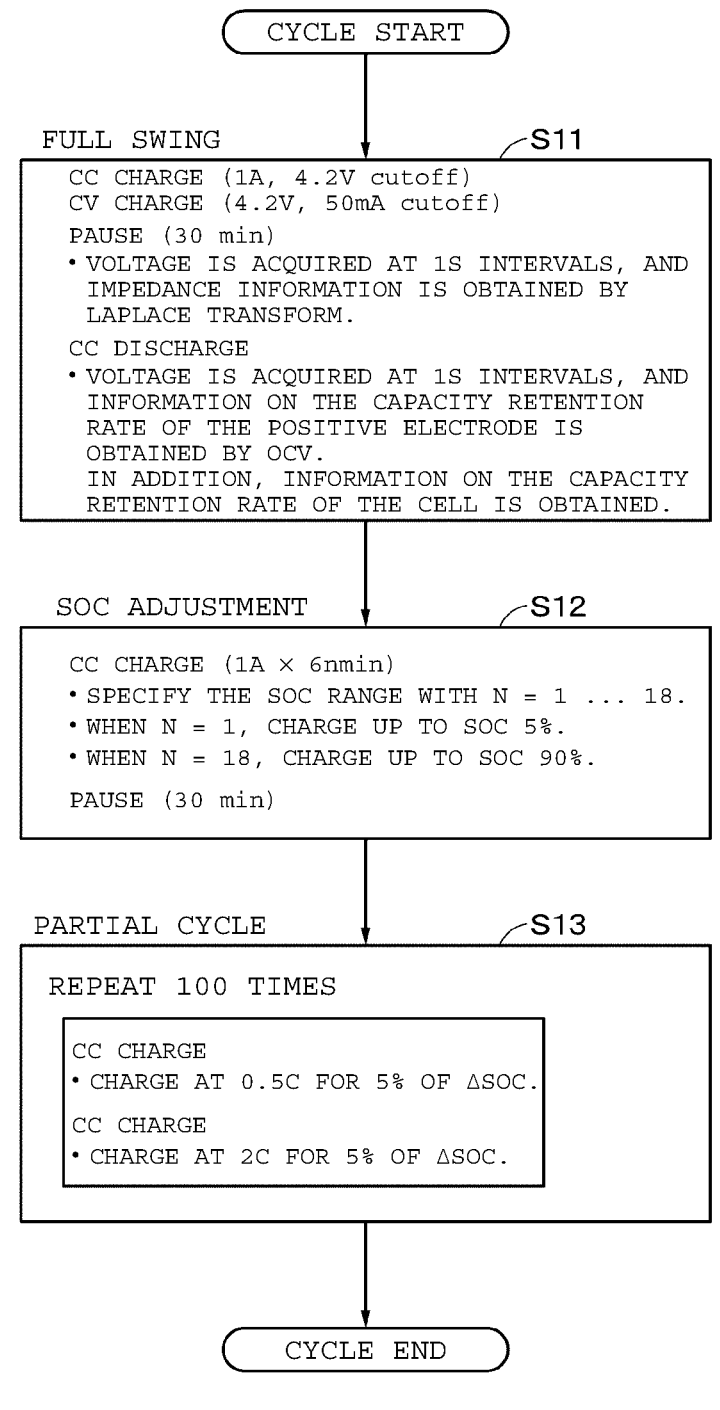

CYCLE START

FULL SWING                    S11

CC CHARGE (1A, 4.2V cutoff)
CV CHARGE (4.2V, 50mA cutoff)
PAUSE (30 min)
• VOLTAGE IS ACQUIRED AT 1S INTERVALS, AND
  IMPEDANCE INFORMATION IS OBTAINED BY
  LAPLACE TRANSFORM.
CC DISCHARGE
• VOLTAGE IS ACQUIRED AT 1S INTERVALS, AND
  INFORMATION ON THE CAPACITY RETENTION
  RATE OF THE POSITIVE ELECTRODE IS
  OBTAINED BY OCV.
  IN ADDITION, INFORMATION ON THE CAPACITY
  RETENTION RATE OF THE CELL IS OBTAINED.

SOC ADJUSTMENT                S12

CC CHARGE (1A × 6nmin)
• SPECIFY THE SOC RANGE WITH N = 1 ... 18.
• WHEN N = 1, CHARGE UP TO SOC 5%.
• WHEN N = 18, CHARGE UP TO SOC 90%.

PAUSE (30 min)

PARTIAL CYCLE                 S13

REPEAT 100 TIMES

CC CHARGE
• CHARGE AT 0.5C FOR 5% OF ΔSOC.
CC CHARGE
• CHARGE AT 2C FOR 5% OF ΔSOC.

CYCLE END

ENERGY STORAGE APPARATUS AND CHARGE/DISCHARGE CONTROL METHOD

CROSS REFERENCE TO RELATED APPLICATIONS

The present application is a continuation of PCT patent application no. PCT/JP2020/039644 filed on Oct. 22, 2020, which claims priority to Japanese patent application no. JP2019-194565 filed on Oct. 25, 2019, the entire contents of which are being incorporated herein by reference.

BACKGROUND

The present application relates to an energy storage apparatus and a charge/discharge control method.

A state of charge (State of Charge, hereinafter, referred to as "SOC") of each battery included in an energy storage apparatus is usually the same. On the other hand, a technique for intentionally disproportionating the SOC of each battery has been provided.

For example, a power supply device has been provided in which by maintaining a low SOC of a first battery and a high SOC of a second battery, a regenerative current from a motor is mainly received by the first battery having a high regenerative power density, and a drive current to the motor is output from the second battery having a high output density.

For example, an energy storage facility monitoring device has been provided that sets a standby SOC indicating an SOC in a standby time during which an energy storage apparatus does not perform charge/discharge based on life characteristics of the energy storage apparatus.

SUMMARY

The present disclosure relates to an energy storage apparatus and a charge/discharge control method.

However, in both the power supply device and the energy storage facility monitoring device described in the Background section, a high SOC standby type battery is used for discharging, and a low SOC standby type battery is used for charging. The high SOC standby type battery needs to be charged again to recover to the original standby SOC when discharged to a predetermined SOC, and the low SOC standby type battery needs to be discharged again to recover to the original standby SOC when charged to a predetermined SOC different from the high SOC standby type battery. However, in the battery used to suppress the frequency fluctuation of the system, small charge/discharge is continuously repeated, and thus it is difficult to perform a recovery operation.

The present application is directed to provide an energy storage apparatus and a charge/discharge control method capable of suppressing deterioration of a secondary battery due to small charge/discharge although when the small charge/discharge is continuously repeated according to an embodiment.

In order to solve the above-described problems, a first technology is an energy storage apparatus including: a plurality of secondary batteries including a negative electrode containing crystalline carbon; and a charge/discharge control unit that controls charge/discharge of the plurality of secondary batteries so that a state of charge does not fall within a range of 50% or more and 70% or less according to an embodiment.

A second technology is a charge/discharge control method including: calculating charge states of a plurality of secondary batteries including a negative electrode containing crystalline carbon; and controlling charge/discharge of the plurality of secondary batteries so that the states of charge of the plurality of secondary batteries do not fall within a range of 50% or more and 70% or less according to an embodiment.

According to an embodiment of the present disclosure, it is possible to suppress deterioration of a secondary battery due to small charge/discharge although when small charge/discharge is continuously repeated.

BRIEF DESCRIPTION OF FIGURES

FIG. 3 is a flowchart for explaining a test of repeating partial charge/discharge.

DETAILED DESCRIPTION

The present disclosure is described in further detail and in reference to the figures according to an embodiment.

Figure 1:
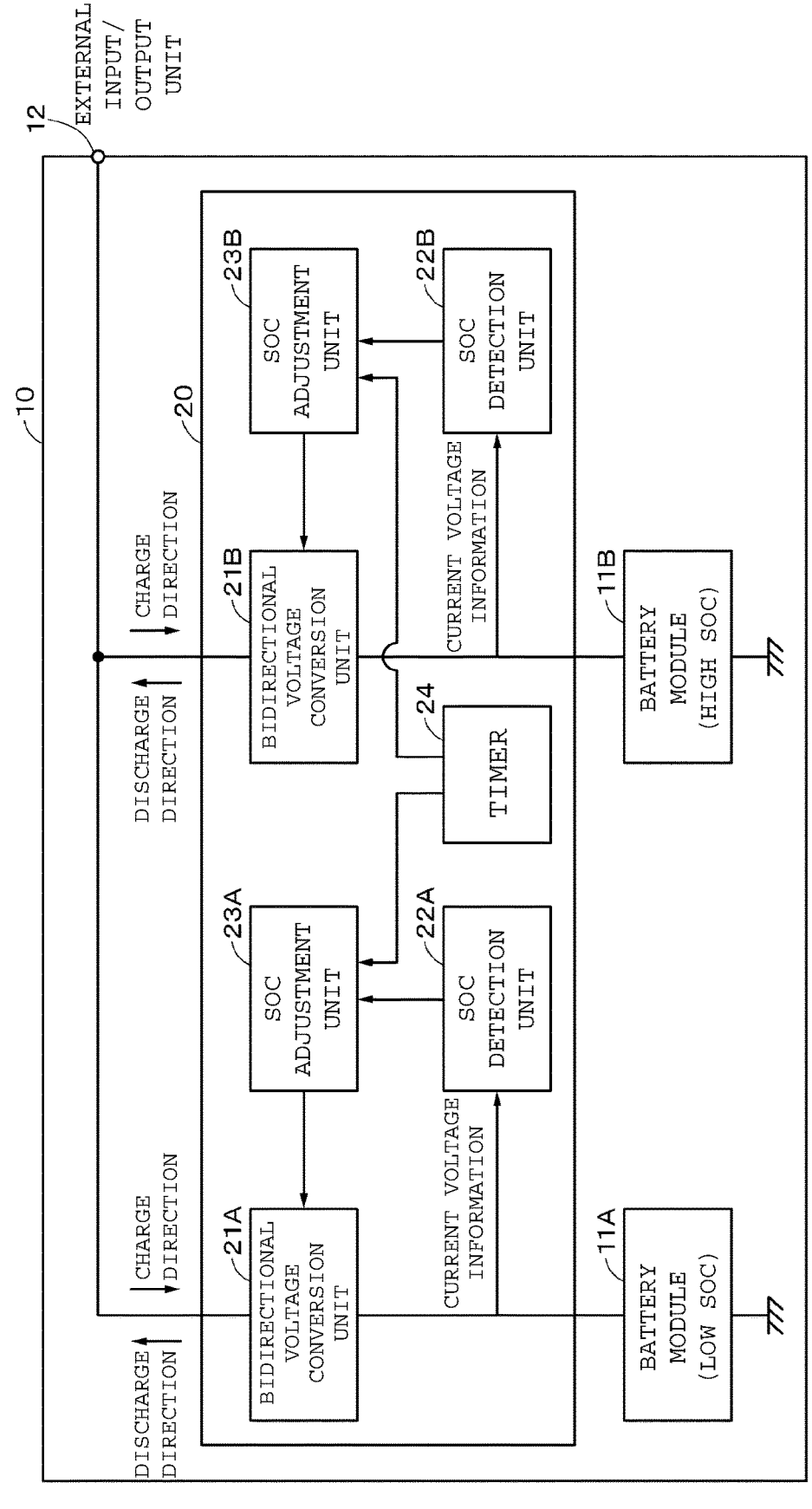
FIG. 1 is a block diagram illustrating an example of a configuration of an energy storage apparatus according to an embodiment.

FIG. 1 is a block diagram illustrating an example of a configuration of an energy storage apparatus 10 according to an embodiment. The energy storage apparatus 10 includes battery modules 11A and 11B, a charge/discharge control unit 20, and an external input/output unit 12. The energy storage apparatus 10 is a peak assist energy storage apparatus used for improving system stability. In an embodiment, a case where the energy storage apparatus 10 includes two battery modules 11A and 11B will be described, but the number of battery modules is not limited thereto, and may be one or three or more.

The battery modules 11A and 11B are used in a low SOC range or a high SOC range. Here, the "low SOC range" refers to a range where the SOC is 0% or more and less than 50%, and the "high SOC range" refers to a range where the SOC is more than 70% and 100% or less.

Each of the battery modules 11A and 11B includes a plurality of secondary batteries. The plurality of secondary batteries are connected in series, in parallel, or in series and parallel. The secondary battery includes a negative electrode containing crystalline carbon as a negative electrode active material. The secondary battery is, for example, a nonaqueous electrolyte secondary battery such as a lithium ion secondary battery or an all-solid-state battery.

The crystalline carbon is, for example, graphite. The graphite includes, for example, at least one of natural graphite and artificial graphite. The secondary battery may contain a material other than the crystalline carbon as a negative electrode active material. Examples of the material other than the crystalline carbon include at least one of a metal element and a metalloid element capable of forming an alloy with lithium. Specific examples thereof include at least one selected from the group consisting of Mg, B, Al, Ti, Ga, In, Si, Ge, Sn, Pb, Bi, Cd, Ag, Zn, Hf, Zr, Y, Pd, and Pt.

The crystalline carbon has a phase transition between stage 1 and stage 2 in a SOC range of 50% or more and 70% or less. The phase transition between these stages is accompanied by a large change in lattice constant as compared with the phase transition between other stages, and a particle size of a negative electrode active material greatly changes, so that it also causes distortion in the negative electrode. By reducing the number of times of phase transition between the stage 1 and the stage 2, although when small charge/discharge is continuously repeated in the energy storage apparatus 10, due to the small charge/discharge, it is possible to suppress the occurrence of deterioration due to the change in the particle size of the negative electrode active material and the occurrence of distortion in the negative electrode. That is, although when the small charge/discharge is continuously repeated in the energy storage apparatus 10, it is possible to suppress deterioration of the secondary battery due to the small charge/discharge.

The external input/output unit 12 is connected to a load that constantly repeats the small charge/discharge.

The charge/discharge control unit 20 measures the SOC of each of the battery modules 11A and 11B. Based on the measurement result of the SOC, the charge/discharge control unit 20 controls the charge/discharge of the battery modules 11A and 11B so that the SOC does not fall within the range of 50% or more and 70% or less. Specifically, based on the measurement result of the SOC, the charge/discharge control unit 20 controls the charge/discharge of the battery modules 11A and 11B such that one of the battery modules 11A and 11B is in the low SOC range and the other is in the high SOC range. That is, the charge/discharge of the battery modules 11A and 11B is controlled such that the stage structure of the crystalline carbon contained as the negative electrode active material in each secondary battery constituting one of the battery modules 11A and 11B is in the state of stage 2 or higher, and the stage structure of the crystalline carbon contained as the negative electrode active material in each secondary battery constituting the other is in the state of stage 1.

The charge/discharge control unit 20 periodically changes the SOC ranges of the battery module 11A and the battery module 11B. By periodically changing the SOC ranges of the battery module 11A and the battery module 11B, the cycle life of the battery modules 11A and 11B can be extended.

The charge/discharge control unit 20 controls the charge/discharge of the battery module 11A and the battery module 11B such that both of the battery module 11A and the battery module 11B are charged when the energy storage apparatus 10 charges and are discharged when the energy storage apparatus 10 discharges.

The charge/discharge control unit 20 includes bidirectional voltage conversion units 21A and 21B, SOC detection units 22A and 22B, SOC adjustment units 23A and 23B, and a timer 24.

A bidirectional voltage conversion unit 21A performs voltage conversion between the voltage of the battery module 11A connected to the bidirectional voltage conversion unit 21A and the voltage of the external input/output unit 12. A bidirectional voltage conversion unit 21B performs voltage conversion between the voltage of the battery module 11B connected to the bidirectional voltage conversion unit 21B and the voltage of the external input/output unit 12.

A SOC detection unit 22A monitors a voltage of the battery module 11A and a current flowing between the battery module 11A and the bidirectional voltage conversion unit 21A, and calculates an SOC of the battery module 11A. The SOC detection unit 22A smooths the calculated SOC by moving and averaging the calculated SOC with a time constant larger than a small charge/discharge for the energy storage apparatus 10.

A SOC detection unit 22B monitors a voltage of the battery module 11B and a current flowing between the battery module 11B and the bidirectional voltage conversion unit 21B, and calculates an SOC of the battery module 11B. The SOC detection unit 22B smooths the calculated SOC by moving and averaging the calculated SOC with a time constant larger than a small charge/discharge for the energy storage apparatus 10.

The SOC adjustment units 23A and 23B have a low SOC charge/discharge mode (first charge/discharge mode) and a high SOC charge/discharge mode (second charge/discharge mode), and the SOC adjustment units 23A and 23B are set to charge/discharge modes different from each other. The SOC adjustment units 23A and 23B periodically switch the charge/discharge mode in response to a notification from the timer 24.

The SOC adjustment unit 23A controls the bidirectional voltage conversion unit 21A based on the smoothed SOC calculated by SOC detection unit 22A. Specifically, the SOC adjustment unit 23A determines whether the smoothed SOC obtained by the SOC detection unit 22A falls within the SOC range of the currently-set charge/discharge mode, and controls the bidirectional voltage conversion unit 21A based on the determination result. As a result, the battery module 11A is charged and discharged according to the set charge/discharge mode.

The SOC adjustment unit 23B controls the bidirectional voltage conversion unit 21B based on the smoothed SOC calculated by SOC detection unit 22B. Specifically, the SOC adjustment unit 23B determines whether the smoothed SOC obtained by the SOC detection unit 22B falls within the SOC range of the currently-set charge/discharge mode, and controls the bidirectional voltage conversion unit 21B based on the determination result. As a result, the battery module 11B is charged and discharged according to the set charge/discharge mode.

The SOC adjustment unit 23A controls the bidirectional voltage conversion unit 21A such that the battery module 11A is charged when the energy storage apparatus 10 is charged, and the battery module 11A is discharged when the energy storage apparatus 10 is discharged. Similarly, the SOC adjustment unit 23B controls the bidirectional voltage conversion unit 21B such that the battery module 11B is charged when the energy storage apparatus 10 is charged, and the battery module 11B is discharged when the energy storage apparatus 10 is discharged.

The timer 24 as a time measurement unit measures a time for periodically switching the SOC ranges of battery module 11A and battery module 11B, and when the measurement time reaches the switching time, notifies the SOC adjustment units 23A and 23B of the switching of the SOC ranges (charge/discharge modes) of the battery module 11A and the battery module 11B.

Figure 2:
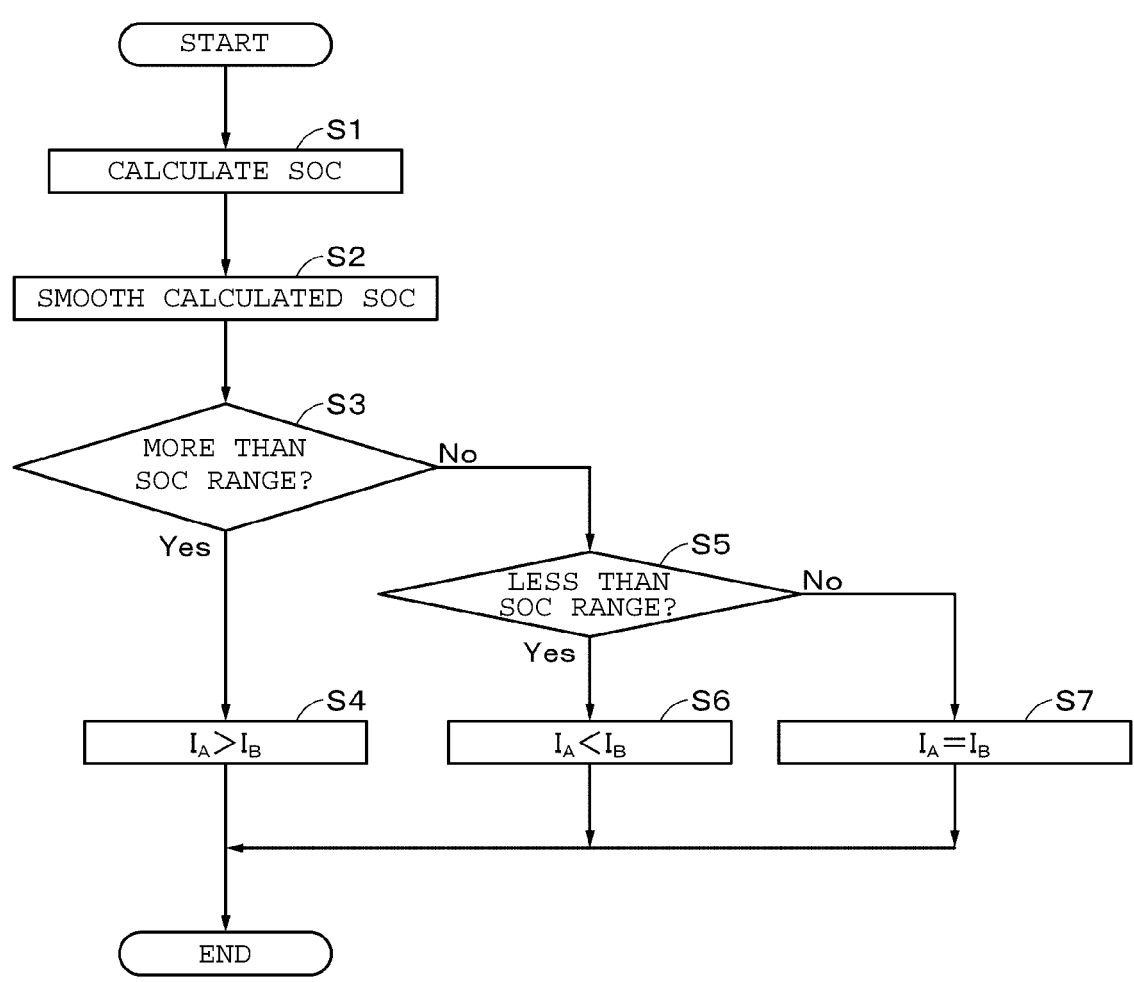
FIG. 2 is a flowchart for explaining an example of a charge/discharge operation of the energy storage apparatus according to an embodiment.

FIG. 2 is a flowchart for explaining an example of a charge/discharge operation of the energy storage apparatus 10 having the above-mentioned configuration. Since the bidirectional voltage conversion unit 21A, the SOC detection unit 22A, and the SOC adjustment unit 23A operate similarly to the bidirectional voltage conversion unit 21B, the SOC detection unit 22B, and the SOC adjustment unit 23B, only the operations of the bidirectional voltage conversion unit 21A, the SOC detection unit 22A, and the SOC adjustment unit 23A will be described below.

First, in step S1, the SOC detection unit 22A monitors a voltage of the battery module 11A and a current flowing between the battery module 11A and the bidirectional voltage conversion unit 21A, and calculates an SOC of the battery module 11A.

Next, in step S2, the SOC detection unit 22A smooths the SOC calculated in step S1 by moving and averaging the calculated SOC with a time constant larger than a small charge/discharge for the energy storage apparatus 10.

Subsequently, in step S3, the SOC adjustment unit 23A determines whether the smoothed SOC calculated in step S2 is more than the SOC range corresponding to the currently set SOC mode.

In a case where it is determined in step S3 that the smoothed SOC is more than the SOC range, in step S4, the SOC adjustment unit 23A controls the bidirectional voltage conversion unit 21A so that a smoothing current $I_A$ in a discharge direction>a smoothing current $I_B$ in the charge direction.

On the other hand, when it is determined in step S3 that the smoothed SOC is not more than the SOC range, in step S5, the SOC adjustment unit 23A determines whether the smoothed SOC obtained in step S2 is less than the SOC range corresponding to the currently set SOC mode.

In a case where it is determined in step S5 that the smoothed SOC is less than the SOC range, in step S6, the SOC adjustment unit 23A controls the bidirectional voltage conversion unit 21A so that a smoothing current $I_A$ in a discharge direction<a smoothing current $I_B$ in the charge direction.

On the other hand, in a case where it is determined in step S5 that the smoothed SOC is not less than the SOC range, in step S7, the SOC adjustment unit 23A controls the bidirectional voltage conversion unit 21A so that a smoothing current $I_A$ in a discharge direction=a smoothing current $I_B$ in the charge direction.

As described above, in the energy storage apparatus 10 according to an embodiment, the charge/discharge control unit 20 controls the charge/discharge of the battery modules 11A and 11B so that the SOC does not fall within the range of 50% or more and 70% or less. As a result, although when the small charge/discharge is continuously repeated in the energy storage apparatus 10, the number of times that the crystal structure of the crystalline carbon contained in the negative electrode is phase-transitioned between the stage 1 and the stage 2 can be reduced, so that it is possible to suppress characteristic deterioration of the secondary battery due to a change in the particle size of the negative electrode active material, the occurrence of distortion in the negative electrode, and the like. That is, although when the small charge/discharge peculiar to the system energy storage apparatus is continuously repeated in the energy storage apparatus 10, it is possible to suppress deterioration of the characteristics of the secondary battery due to the small charge/discharge.

In the above-described embodiment, the case where the charge/discharge control unit 20 controls the charge/discharge of the battery modules 11A and 11B such that one of the battery modules 11A and 11B is in the low SOC range and the other is in the high SOC range has been described. However, the charge/discharge of the battery modules 11A and 11B may be controlled such that the state of charge of both the battery modules 11A and 11B is in the low SOC range or the high SOC range according to an embodiment. That is, the charge/discharge of the battery modules 11A and 11B may be controlled such that the stage structure of the crystalline carbon contained as the negative electrode active material in each secondary battery constituting both the battery modules 11A and 11B is in the state of the stage 2 or more or the state of the stage 1.

Specifically, the SOC adjustment units 23A and 23B may be set to the same charge/discharge mode. That is, both the SOC adjustment units 23A and 23B may be set to the low SOC charge/discharge mode or the high SOC charge/discharge mode.

The charge/discharge control unit 20 may periodically change the SOC ranges of both the battery modules 11A and 11B. Specifically, the SOC adjustment units 23A and 23B may periodically change the charge/discharge mode in response to a notification from the timer 24.

In the embodiment described above, the charge/discharge control unit 20 includes the timer 24, and the charge/discharge modes of the SOC adjustment units 23A and 23B are switched in accordance with the notification from the timer 24 to the SOC adjustment units 23A and 23B. However, the charge/discharge control unit 20 may not include the timer 24, and the charge/discharge modes of the SOC adjustment units 23A and 23B may not be switched according to an embodiment.

EXAMPLES

Hereinafter, the present invention will be described with reference to examples, but the present technology is not limited only to these examples.

Examples 1 to 7, Comparative Examples 1 to 3

First, 10 commercially available cylindrical lithium ion secondary batteries (positive electrode active material: NCM (nickel-cobalt-manganese)-based positive electrode material, negative electrode active material: graphite) were prepared as samples. Next, the prepared 10 secondary batteries were connected to CH 1 to 10 of a secondary battery charge/discharge inspection apparatus manufactured by SECI (SoftEnergy Controls Inc.), respectively.

Figure 4:
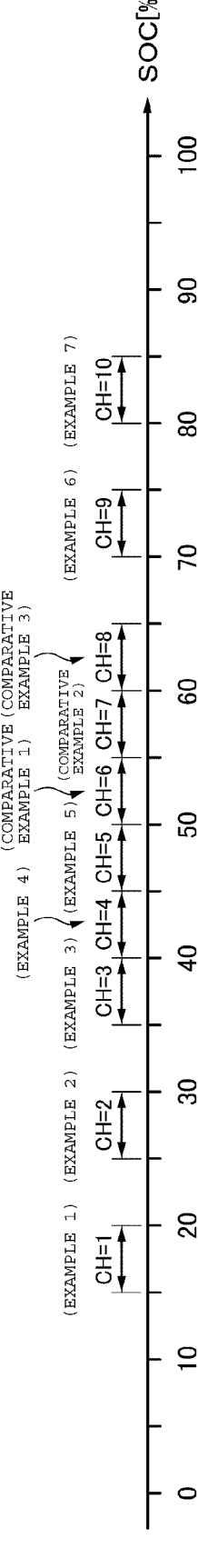
FIG. 4 is a diagram illustrating a SOC range in a partial cycle test.

Next, based on the flowchart shown in FIG. 3, partial charge/discharge was repeated for the prepared secondary battery. The SOC range was set to 10 conditions, and the temperature condition was set to 35° C. FIG. 4 illustrates the SOC ranges for partial cycles of CH 1 to 10 (Examples 1 to 7, Comparative Examples 1 to 3).

First, in step S11, each secondary battery was charged and discharged in a full swing by the secondary battery charge/discharge inspection apparatus. Next, in step S12, the SOC of each secondary battery was adjusted by the secondary battery charge/discharge inspection apparatus. Next, in step S13, a partial cycle (charge/discharge with ΔSOC=5%) was performed 100 times. The cycle of steps S11 to 13 was repeated until the number of partial cycles reached 11000. (Evaluation of Capacity Retention Rate)

The cycle number dependence of the capacity retention rate and the SOC dependence of the capacity retention rate in the charge/discharge control methods of Examples 1 to 7 and Comparative Examples 1 to 3 described above were determined. The capacity was calculated from a discharge curve (0.05 C) of full swing charge/discharge. In addition, the capacity retention rate was calculated based on the measurement value of the first full swing. In addition, the enlargement ratio of each of the positive and negative electrodes was calculated by performing OCV analysis of the discharge curve of the full swing charge/discharge.

(Evaluation of Reaction Resistance)

The reaction resistance of the secondary battery used in the charge/discharge control method in Examples 1 to 7 and Comparative Examples 1 to 3 was measured by a GITT (Galvanostatic Intermittent Titration Technique) method.

(Evaluation Results)

Figure 5:
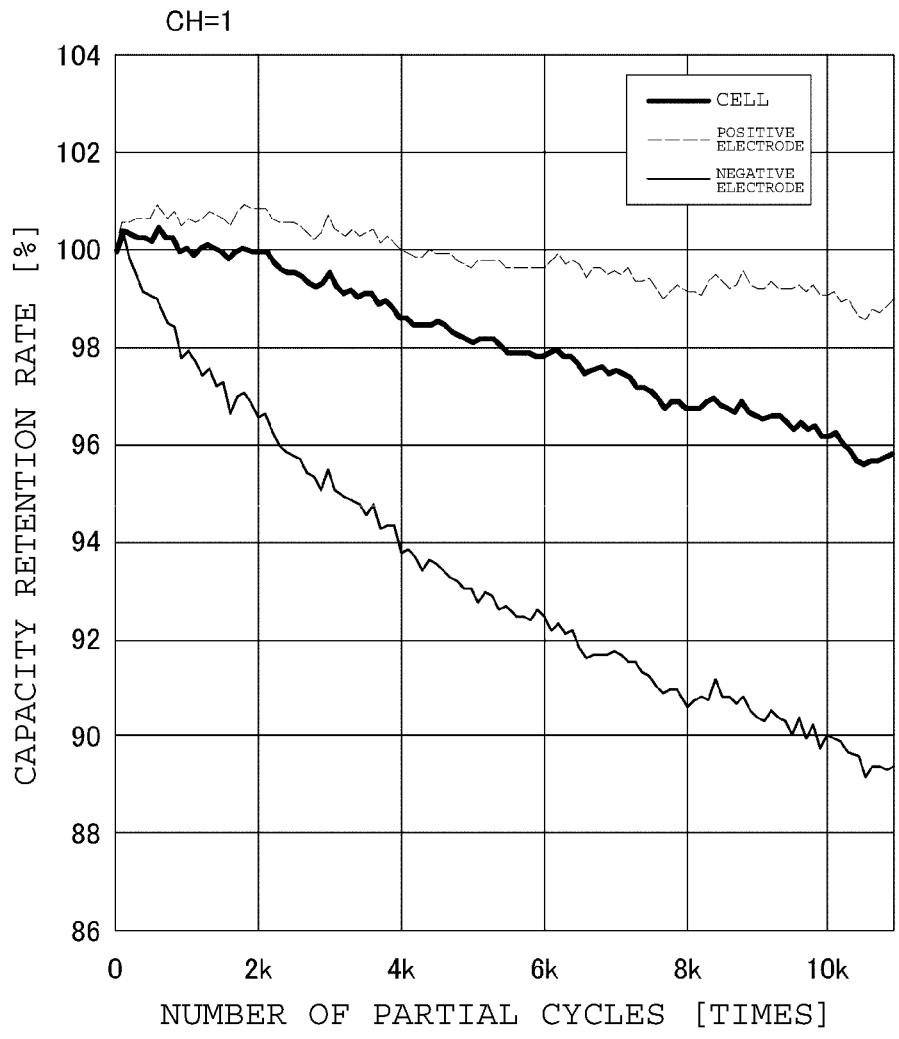
FIG. 5 is a graph illustrating a cycle number dependency of a capacity retention rate.

FIG. 5 is a graph illustrating the cycle number dependency of the capacity retention rate of the secondary battery of CH1 (SOC range: 15% to 20%). It can be said that degradation of the negative electrode due to continuous repetition of the small charge/discharge is faster than that of the positive electrode, and the negative electrode is dominant. This tendency was similar in the secondary battery of CH2 to 10. Therefore, it is considered that the deterioration of the negative electrode is greatly involved in the deterioration of the battery. That is, it is considered that the life of the battery can be extended by performing charge/discharge control such that deterioration of the negative electrode is minimized.

Figure 6:
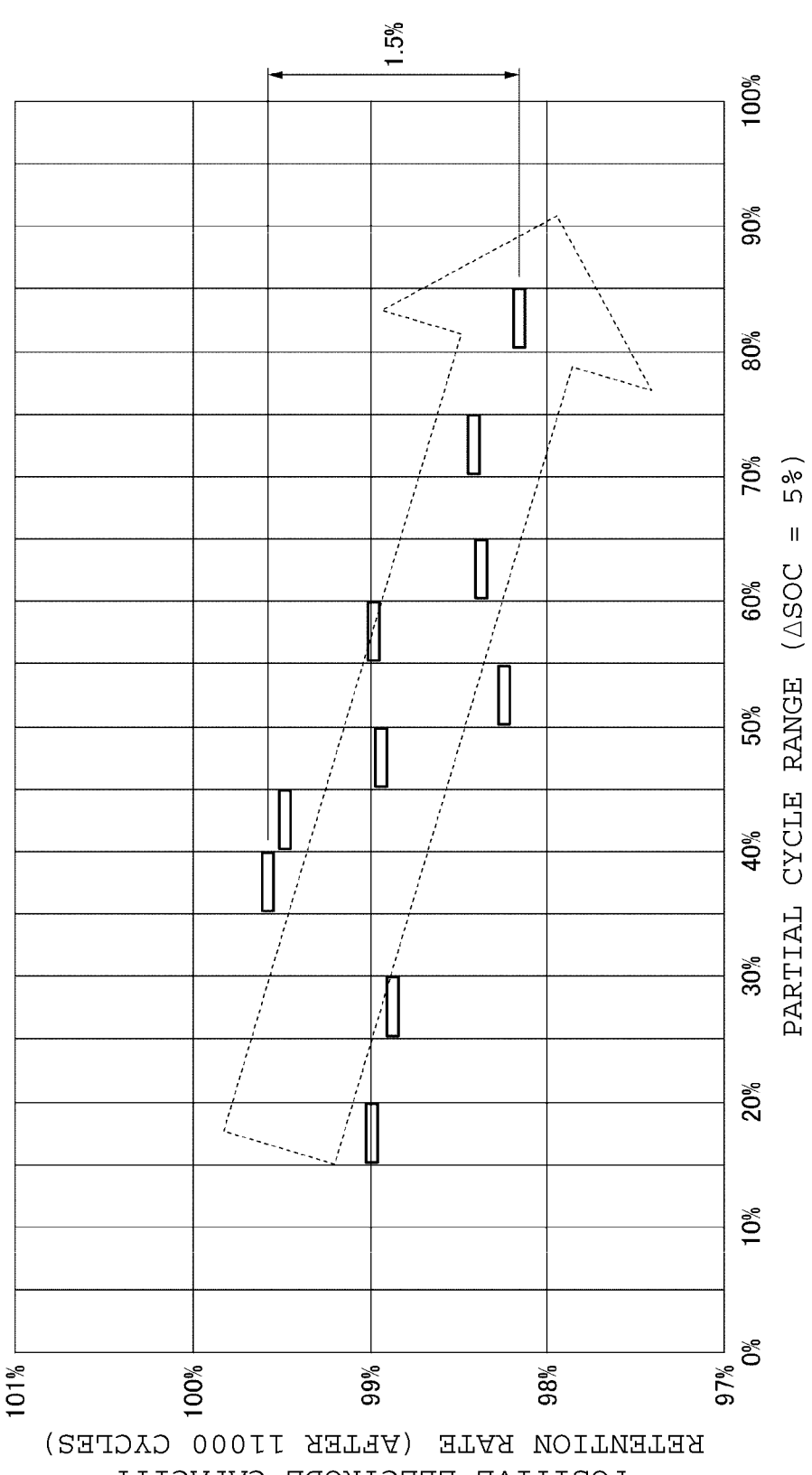
FIG. 6 is a graph illustrating a SOC dependency of a positive electrode capacity retention rate.

FIG. 6 is a graph illustrating a SOC dependency of a positive electrode capacity retention rate. The capacity retention rate of the positive electrode decreases as the SOC increases, which indicates a change of downward rightward. This tendency is considered to be related to the phase transition of the ternary (NMC-based) positive electrode material used as the positive electrode active material.

Figure 7:
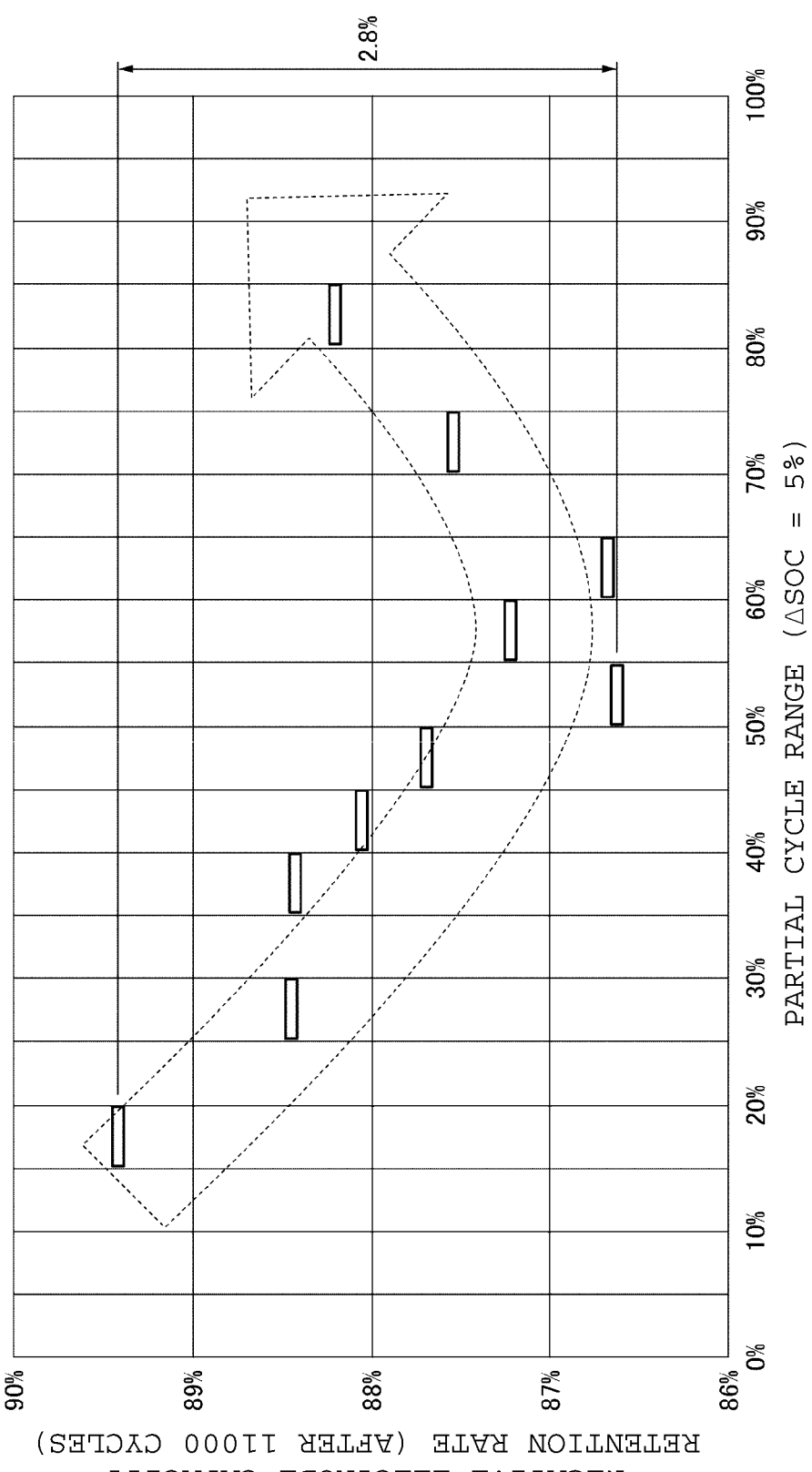
FIG. 7 is a graph illustrating a SOC dependency of a negative electrode capacity retention rate.

FIG. 7 is a graph illustrating a SOC dependency of a negative electrode capacity retention rate. The negative electrode capacity retention rate indicates a mortar shape change in which the SOC decreases in a range of 50% or more and 70% or less (that is, in the vicinity of the center of the SOC). This tendency is considered to be related to the phase transition of graphite between the stage 1 and the stage 2.

Figure 8:
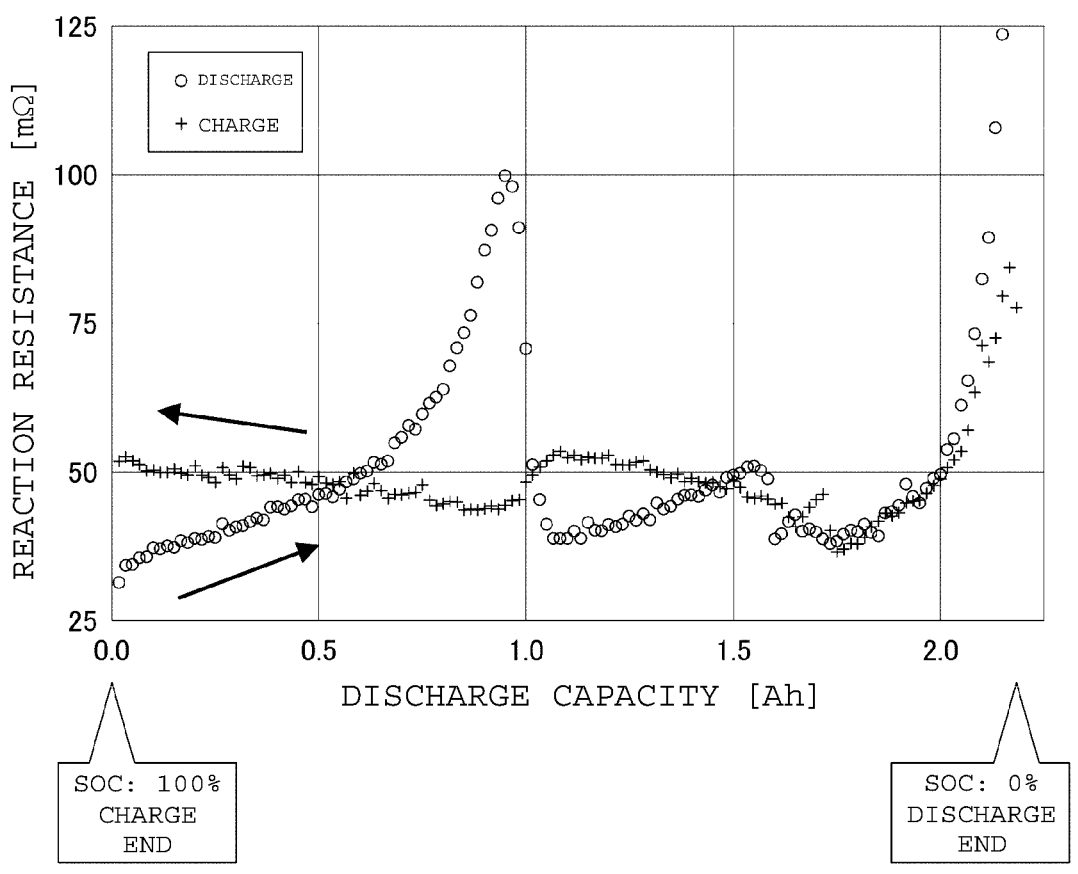
FIG. 8 is a graph illustrating a SOC dependency of reaction resistance measured by a GITT method.

FIG. 8 is a graph illustrating a SOC dependency of reaction resistance measured by a GITT method. When the SOC is 50% or more and 70% or less, there is a large reaction resistance associated with the phase transition between the stage 1 and the stage 2. Therefore, when the SOC is in the range of 50% or more and 70% or less, it is considered that distortion in the electrode due to a change in the particle size of the negative electrode active material, local heat generation in the electrode, and deterioration due to local overvoltage are caused.

The small charge/discharge is continuously repeated in the secondary battery used for improving the system stability. Further, in the related art, it is considered that the secondary battery used for improving the system stability desirably stands by in the vicinity of the SOC 50% in order to maximize both the power receiving capability and the power supply capability. However, according to the above evaluation results, in order to extend the life of the secondary battery, it is effective to consider extending the life of the negative electrode, and it is desirable to control charge/discharge so that the small charge/discharge is not continuously repeated in the SOC range of 50% or more and 70% or less.

Although one or more embodiments of the present disclosure and modifications thereof have been described above, the present disclosure is not limited to the above-described embodiments and the modifications thereof, and various modifications based on the technical idea of the present disclosure can be made.

For example, the configurations, methods, steps, materials, numerical values, and the like described in the above-described embodiments and modifications thereof are merely examples, and different configurations, methods, steps, materials, numerical values, and the like may be used as necessary.

The configurations, methods, steps, materials, numerical values, and the like of the above-described embodiments and modifications thereof can be combined with each other without departing from the spirit and scope of the present disclosure.

In the numerical range described in stages in the above-described embodiment and the modifications thereof, the upper limit value or the lower limit value of the numerical range in a certain stage may be replaced with the upper limit value or the lower limit value of the numerical range in another stage.

The materials exemplified in the above-described embodiments and the modifications thereof can be used alone or in combination of two or more unless otherwise specified.

DESCRIPTION OF REFERENCE SYMBOLS

10: Energy storage apparatus
11A, 11B: Energy storage module
12: External input/output unit
20: Charge/discharge control unit
21A, 21B: Bidirectional voltage conversion unit
22A, 22B: SOC detection unit
23A, 23B: SOC adjustment unit
24: Timer It should be understood that various changes and modifications to the presently preferred described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An energy storage apparatus comprising:
an external input/output unit;
a first battery module electrically connected to the external input/output unit and comprising a plurality of secondary batteries including a negative electrode including graphite; and
a second battery module electrically connected in parallel with the first battery module relative to the external input/output unit and comprising a plurality of secondary batteries including a negative electrode including graphite; and
a charge/discharge control unit that is configured to control charge/discharge of the plurality of secondary batteries so that a state of charge of the secondary batteries included in the first battery module falls within a range of 0% or more and less than 50%, and the state of charge of the secondary batteries included in the second battery module falls within a range of more than 70% and 100% or less, wherein
the charge/discharge control unit comprises a first bidirectional voltage conversion unit and a second bidirectional voltage conversion unit,
the first bidirectional voltage conversion unit is connected in series between the external input/output unit and the first battery module, and performs voltage conversion between the voltage of the first battery module and the voltage of the external input/output unit,
the second bidirectional voltage conversion unit is connected electrically in parallel with the first bidirectional voltage conversion unit relative to the external input/output unit, and is connected in series between the external input/output unit and the second battery module, and performs voltage conversion between the voltage of the second battery module and the voltage of the external input/output unit, and the charge/discharge control unit is configured to control the charge/discharge of the plurality of secondary batteries such that a stage structure of the graphite included in the plurality of secondary batteries in the first battery module is in a state of stage 2 or more, and a stage structure of the graphite included in the plurality of secondary batteries in the second battery module is in a state of stage 1.

2. The energy storage apparatus according to claim 1, the charge/discharge control unit controls charge/discharge of the plurality of secondary batteries such that when the first battery module is charged, the second battery module is charged, and such that when the first battery module is discharged, the second battery module is discharged.

3. The energy storage apparatus according to claim 1, wherein the charge/discharge control unit is configured to control the charge/discharge of the plurality of secondary batteries such that both the plurality of secondary batteries included in the first battery module and the plurality of secondary batteries included in the second battery module are charged when the energy storage apparatus charges and are discharged when the energy storage apparatus discharges.

4. A charge/discharge control method comprising:

calculating charge states of a plurality of secondary batteries including a negative electrode including graphite;

controlling charge/discharge of the plurality of secondary batteries so that the states of charge of the plurality of secondary batteries of the secondary batteries included in a first battery module falls within a range of 0% or more and less than 50%, and the state of charge of the secondary batteries included in a second battery module falls within a range of more than 70% and 100% or less, wherein the first battery module is electrically connected to an external input/output unit, and the second battery module is electrically connected in parallel with the first battery module relative to the external input/output unit;

performing, by a first bidirectional voltage conversion unit, voltage conversion between the voltage of the first battery module and the voltage of the external input/output unit, wherein the first bidirectional voltage conversion unit is connected in series between the external input/output unit and the first battery module, performing, by a second bidirectional voltage conversion unit, voltage conversion between the voltage of the second battery module and the voltage of the external input/output unit, wherein the second bidirectional voltage conversion unit is connected electrically in parallel with the first bidirectional voltage conversion unit relative to the external input/output unit, and is connected in series between the external input/output unit and the second battery module, and controlling the charge/discharge of the plurality of secondary batteries such that a stage structure of the graphite included in the plurality of secondary batteries in the first battery module is in a state of stage 2 or more, and a stage structure of the graphite included in the plurality of secondary batteries in the second battery module is in a state of stage 1.

5. The charge/discharge control method according to claim 4, further comprising:

controlling charge/discharge of the plurality of secondary batteries such that when the first battery module is charged, the second battery module is charged; and controlling charge/discharge of the plurality of secondary batteries such that when the first battery module is discharged, the second battery module is discharged.

6. The charge/discharge control method according to claim 4, further comprising:

controlling the charge/discharge of the plurality of secondary batteries such that both the plurality of secondary batteries included in the first battery module and the plurality of secondary batteries included in the second battery module are charged when the energy storage apparatus charges and are discharged when the energy storage apparatus discharges.

\*  \*  \*  \*  \*